No. 612,102. Patented Oct. 11, 1898.
J. A. HEANY.
WHEEL FOR VEHICLES.
(Application filed Mar. 5, 1898.)
(No Model.)

WITNESSES:
M. C. Roberts,
Geo. G. Roberts

INVENTOR
John Allen Heany
BY
George E. Buckley
his ATTORNEY.

THE NORRIS PETERS CO., PHOTO-LITHO., WASHINGTON, D. C.

UNITED STATES PATENT OFFICE.

JOHN ALLEN HEANY, OF PHILADELPHIA, PENNSYLVANIA.

WHEEL FOR VEHICLES.

SPECIFICATION forming part of Letters Patent No. 612,102, dated October 11, 1898.

Application filed March 5, 1898. Serial No. 672,757. (No model.)

*To all whom it may concern:*

Be it known that I, JOHN ALLEN HEANY, a citizen of the United States, and a resident of Philadelphia, Pennsylvania, have invented certain Improvements in Wheels for Vehicles, of which the following is a description, reference being had to the accompanying drawings, making part hereof.

The nature and object of my invention will appear from the following description and claim.

Figure 1:
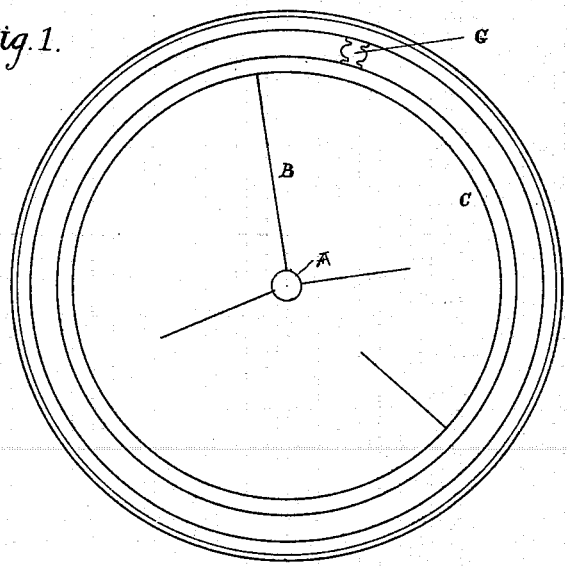
Figure 2:
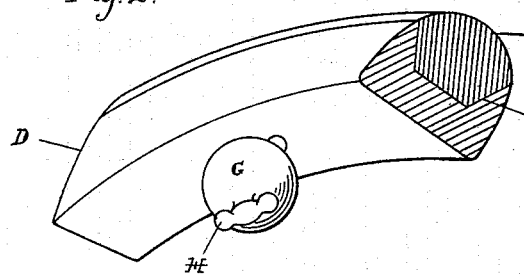
Figure 3:
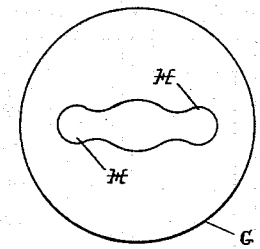
Figure 4:
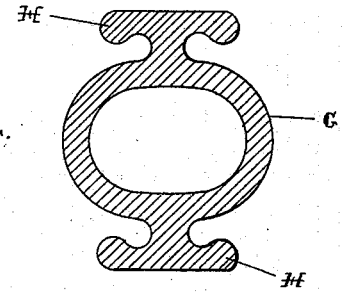
Figure 5:
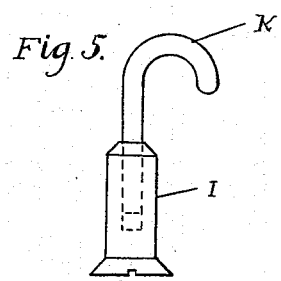

In the drawings, Figure 1 is an elevation of my wheel with its stiff inner rim and stiff felly, showing also the hollow pneumatic balls with their flanges or cleats to secure them to the rim; and Fig. 2, a detached perspective view of a section of the felly, showing one of the balls secured thereto; Fig. 3, a plan view of one of the balls, showing one of the flanges or cleats; Fig. 4, a vertical sectional view of one of my balls; Fig. 5, a detached elevation of one of the bicycle-screws with an end hook by which the flange of the ball is secured to the felly or to the rim.

A is the hub; B B, the radiating spokes; C, the stiff inner rim; D, the stiff outer rim or felly; E, the outer rubber tire sprung into groove F.

G G are hollow pneumatic rubber balls provided with integral flanges or cleats H, and I a bicycle-screw provided at its end with a hook K, which latter is adapted to engage around the end of flange H. The screw I, with its hook K, constitutes a "holder," and I shall so designate it in the claim. The rim C and felly D are concentric, one of larger diameter than the other, with a space between them, and are made of wood, metal, or other suitable material. The screw I passes through the felly or the rim, as the case may be, and its hook clasps one end of flange H in the small part. It will be noticed that the ends of the flanges are "knobbed" to prevent them slipping out of the hooks.

What I claim as new is—

In a wheel for vehicles, the combination of hub A; spokes B; stiff inner rim C; stiff felly D, and hollow pneumatic balls G, provided with flanges H; holders I to attach said flanges to the inner face of the felly and the outer face of the inner rim; whereby, the pneumatic balls are held between them, substantially as described.

JOHN ALLEN HEANY.

Witnesses:
WM. R. HELLYER,
ANDREW BROGAN.